(12) United States Patent
Imboden et al.

(10) Patent No.: US 7,749,178 B2
(45) Date of Patent: Jul. 6, 2010

(54) INDUCTIVELY CHARGEABLE MASSAGER

(75) Inventors: Ethan Frederic Imboden, San Francisco, CA (US); Roland Jeffrey Wyatt, Albany, CA (US); R. Benjamin Knapp, Sebastopol, CA (US); Ken Paul Koller, San Franciso, CA (US); John Richard Rees, Pacifica, CA (US)

(73) Assignee: Jimmyjane, Inc., San Francisco, CA (US)

( * ) Notice: Subject to any disclaimer, the term of this patent is extended or adjusted under 35 U.S.C. 154(b) by 94 days.

(21) Appl. No.: 11/344,987

(22) Filed: Feb. 1, 2006

(65) Prior Publication Data
US 2007/0179412 A1 Aug. 2, 2007

(51) Int. Cl.
*A61H 23/02* (2006.01)

(52) U.S. Cl. .............................. 601/15; 601/72; 601/80; 601/46

(58) Field of Classification Search .................. 601/46, 601/48, 70, 72, 73, 80, 15, 17, 18, 136, 137, 601/138
See application file for complete search history.

(56) References Cited

U.S. PATENT DOCUMENTS

| | | | |
|---|---|---|---|
| 3,699,952 A * | 10/1972 | Waters et al. ................. | 601/18 |
| 4,149,530 A * | 4/1979 | Gow ........................... | 601/72 |
| D366,703 S | 1/1996 | Huen ......................... | D24/214 |
| 5,857,986 A | 1/1999 | Moriyasu | |
| 5,894,670 A * | 4/1999 | Iso et al. ....................... | 30/541 |
| D414,582 S | 9/1999 | Hwang ......................... | D28/9 |
| 5,951,500 A | 9/1999 | Cutler | |
| 5,956,484 A | 9/1999 | Rosenberg et al. | |
| 6,027,463 A | 2/2000 | Moriyasu | |
| 6,028,531 A | 2/2000 | Wanderlich | |
| 6,312,397 B1 | 11/2001 | Gebhard | |
| 6,368,268 B1 | 4/2002 | Sandvick et al. | |
| D475,793 S | 6/2003 | Tinsley ....................... | D24/214 |
| D509,301 S | 9/2005 | Talbot et al. ................ | D24/215 |
| D510,628 S | 10/2005 | Talbot et al. ................ | D24/215 |
| D549,350 S | 8/2007 | Wu ............................ | D24/215 |

(Continued)

FOREIGN PATENT DOCUMENTS

DE          33 16 100 A1    11/1984

(Continued)

OTHER PUBLICATIONS

International Search Report and Written Opinion of the International Searching Authority, Application No. PCT/US07/02259, Aug. 2007.

(Continued)

*Primary Examiner*—Danton DeMille
(74) *Attorney, Agent, or Firm*—Winston & Strawn LLP

(57) ABSTRACT

A massager (12) includes an inductively chargeable battery (48), avoiding the need to deal with batteries and cords while providing a pleasant exothermic warmth. Different embodiments of sealing and skinning (13) make the massager (12) hygienically safe and fluid- and water-resistant. Sophisticated controls (50) provide the massager with the ability to respond to direct-mounted user controls (20, 22), wireless communication controls such as remote controls (30) and a plethora of other protocol-compatible devices, systems and media. A mating base (14) supports the massager (12) for inductive charging in a stable, aesthetically pleasant and safe relationship.

27 Claims, 5 Drawing Sheets

U.S. PATENT DOCUMENTS

| | | | |
|---|---|---|---|
| 2002/0065477 A1 | 5/2002 | Boyd et al. | |
| 2002/0095103 A1* | 7/2002 | Blue | 601/46 |
| 2002/0133103 A1 | 9/2002 | Williams et al. | |
| 2002/0156402 A1* | 10/2002 | Woog et al. | 601/46 |
| 2003/0103088 A1* | 6/2003 | Dresti et al. | 345/835 |
| 2003/0195441 A1 | 10/2003 | Firouzgar | |
| 2004/0068213 A1 | 4/2004 | Fujisawa | |
| 2004/0132439 A1 | 7/2004 | Tyagi et al. | |
| 2004/0193079 A1 | 9/2004 | Siddhartha | |
| 2005/0004429 A1 | 1/2005 | Tracanna | |
| 2005/0027794 A1 | 2/2005 | Decker | |
| 2005/0054450 A1 | 3/2005 | Yamaguchi | |
| 2005/0075072 A1 | 4/2005 | Apitzsch | |
| 2005/0090768 A1 | 4/2005 | Brattesai | |
| 2005/0268472 A1* | 12/2005 | Bourilkov et al. | 30/537 |
| 2006/0058714 A1* | 3/2006 | Rhoades | 601/73 |
| 2006/0278514 A1* | 12/2006 | Roussin-Bouchard | 200/512 |
| 2007/0179412 A1 | 8/2007 | Imboden et al. | 601/72 |

FOREIGN PATENT DOCUMENTS

| | | |
|---|---|---|
| DE | 103 52 219 | 6/2005 |
| DE | 103 52 219 A1 | 6/2005 |
| DE | 20 2005 015 767 U1 | 2/2006 |
| WO | WO 2004/069128 | 8/2004 |

OTHER PUBLICATIONS

Partial International Search Results, Application No. PCT/US2008/050641, Jul. 2007.

International Search Report and Written Opinion of the International Searching Authority, Application No. PCT/US2008/050641, Jul. 2007.

* cited by examiner

INDUCTIVELY CHARGEABLE MASSAGER

RELATED APPLICATIONS

This application is related to co-pending U.S. patent application Ser. No. 11/345,455 and to co-pending U.S. patent application Ser. No. 11/345,456, each filed on same date herewith and each of which is incorporated herein in its entirety by reference.

FIELD OF THE INVENTION

The present invention relates generally to massagers and more particularly to a massager with an inductively chargeable power source.

BACKGROUND OF THE INVENTION

Personal vibrators, also known variously as vibrators, massagers, vibrating massagers and by numerous other names, are well-known in the art. They come in a variety of configurations and perform a variety of functions, ranging from medical therapy to erotic stimulation. They typically are battery-powered or run on conventional alternating current electricity.

As noted above, many types of prior art vibrating massagers have been powered by internally contained, disposable batteries. They operate for a period of time on the battery power, subsequently requiring some degree of disassembly, battery replacement and reassembly. It will be apparent to the reader that this type of battery operation has drawbacks, including for example, limited time of operation and the inconvenience and expense associated with the necessary battery replacement.

While some vibrating massagers operate on AC power, for example U.S. 110V or European 220V power, these massagers tend to be large and unsafe for internal use or use in damp environments. They also have the inconvenience of requiring proximity to a wall plug.

In addition to their limitations as to power sources, prior art vibrating massagers are similarly limited in their modes of operation. A typical vibrating massager includes a switch mounted directly on the vibrator housing. Massagers are known which include controls that are connected to the vibrating device by a wire. Control wires, however, are inconvenient in the same manner that electrical wiring to supply power is inconvenient. Further, controls for these wired devices are typically limited to simplistic control functions, such as on/off and intensity functions.

More recently, vibrating massagers have become known that use wireless remote controls to control various functions. As with the wired remote controls, the controlled functions are generally very simplistic. They are unable to transmit or receive complex control signals and are usually incapable of networking with other devices. Many are limited in range and consume excessive power. See, for example relating to wireless vibrators: U.S. Pat. No. 6,028,531 to Wanderlich (a terminal unit for a mobile communications system), U.S. patent application 2005/0075072 to Apitzsch (a remote-control vibrator), U.S. patent application 2003/0195441 to Firouzgar (a remotely controllable stimulator).

Looking more particularly at U.S. patent application 2005/0075072 to Apitzsch, the published application mentions the use of inductive charging for a personal vibrator, however falls short of teaching or suggesting any useful and functional inductive charging structures or functions. The patent further shows the use of Bluetooth™ technology to control the vibrator, teaching relatively limited functionality of the wireless controls.

Another type of controllable vibrator uses audio control signals to affect the operation of the vibrator. See, for example, U.S. Pat. No. 5,951,500 to Cutler (a massage system responsive to audio), U.S. Pat. No. 6,027,463 to Moriyasu (a music massager) and U.S. patent application 2002/0065477 (an audio interactive vibrator).

Yet another type of vibrating device can be controlled using external computers, directly and/or through network connections to the Internet. These computer-controlled vibrating massagers are quite complex and require significant infrastructure to operate. See, for example relating to computer-controlled vibrators: U.S. Pat. No. 5,857,986 (an interactive vibrator for multimedia). See, for example relating to network—connected devices, U.S. Pat. No. 5,956,484 to Rosenberg et al. (force feedback over a computer network), U.S. patent application 2005/0027794 to Decker (the remote control of a wireless device using a web browser), U.S. patent application 2004/0132439 to Tyagi et al. (a remotely controllable wireless sexual toy), U.S. Pat. No. 6,368,268 to Sandvick et al. (the control of sexual aids using digital computer networks), and U.S. patent application 2002/0133103 to Williams et al. (an Internet—based electrically—operated sexual aide).

As discussed above, prior art vibrating massagers generally exhibit one or more drawbacks relating to their power source and/or controls. Replaceable batteries are inconvenient while electrical plugs are both inconvenient and inappropriate for smaller devices. Built-in and/or wired controls are generally inconvenient and limited in function. Available wireless controls are limited in function, particularly as relates to interoperability with other devices. Computer and computer network controls, while potentially providing significant functionality, are expensive and complex, and without wireless control, are inconvenient to use.

SUMMARY OF THE INVENTION

In accordance with the present invention, there is provided a new and improved vibrating massager. A first feature of the present invention is an inductive charging system, the sealed vibrating massager receiving power through a supportive base containing an internal power source. A second feature of the present invention is a highly functional radio frequency (RF) wireless control system such as the ZigBee™ wireless communications protocols, enabling vastly enhanced functionality in comparison to the prior art.

In accordance with one embodiment of the invention there is provided a massager apparatus, comprising: a massager including a massager housing, a first electric motive source contained within the massager housing, a rechargeable battery contained within the massager housing connected to the first electric motive source, and a first coupler contained within the massager housing connected to the battery; and a base including a base housing, a power connector at least partially contained within the base housing, a second coupler contained within the base housing connected to the power connector, and the base housing including a surface formed to support the massager housing with the first coupler energetically coupled to the second coupler; whereby the battery in the massager can be charged using the base.

DESCRIPTION OF THE DRAWING FIGURES

These and other objects, features and advantages of the present invention will become apparent to the reader through a consideration of the Detailed Description of the Invention when considered in conjunction with the Drawing Figures, in which.

DETAILED DESCRIPTION OF THE INVENTION

Figure 1:
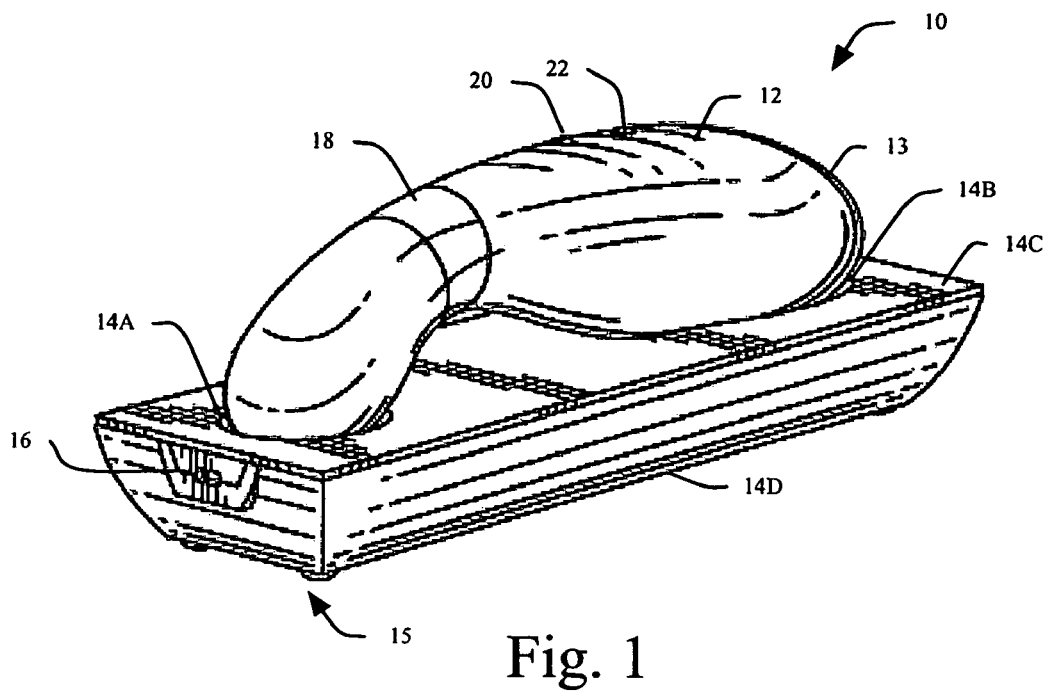
FIG. 1 is a perspective of an inductively chargeable vibrating massager on a charging base.

There is provided herein a new and improved vibrating massager assembly including a vibrating massager, a base and a remote control. The vibrating massager includes an internally contained rechargeable battery and an induction coil with charging circuitry. The base is both supportive and includes inductive coupling equipment for charging the vibrator battery. To take full advantage of the inductive charging features, the vibrating massager is sealed, in the illustrated embodiment by both ultrasonic welding of a plastic housing and skinning with a relatively thin, bio-compatible skin, whereby to effectively protect the massager and improve the human user experience. The remote control of the present invention uses the ZigBee™ wireless communications protocols to control the vibrator and provides vastly enhanced functionality in comparison to the prior art.

As used herein, examples and illustrations are exemplary in nature and not limiting. Like reference numerals between the various Figures indicate like elements.

Structure of the Invention

Figure 2:
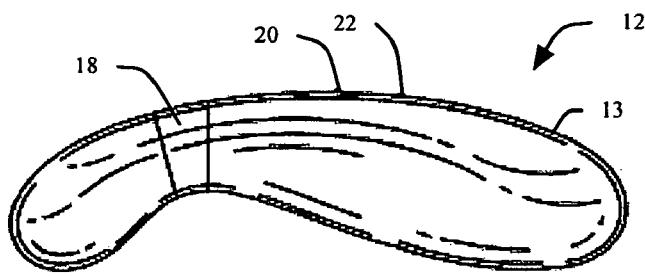
FIG. 2 is a side view of the vibrating massager of FIG. 1.

With reference now to FIGS. 1 and 2 there is shown a new and improved vibrating massager system 10 including an inductively chargeable vibrating massager 12 and a supportive, inductive charging base 14. Vibrating massager 12 is shown in the shape of a fluid, organic form. The organic form provides a multitude of different types of surfaces suitable for different types of contact with the body, thereby offering flexibility of operation and many varieties of sensation for the user. As shown, the illustrated form is functional to provide medical massage, such as for the neck, back, feet, etc. as well as sexual stimulation.

In the illustrated embodiment, vibrating massager 12 is sealed first by ultrasonic welding, and further by a thin, bio-compatible 'skin' 13, formed, for example, from silicone or a thermoplastic elastomer (TPE). Sealing takes full advantage of the benefits of inductive charging, i.e. not having to open the unit to replace batteries or deal with an external cord, preferably making the vibrating massager secure from external fluids and liquids, as well as providing a tactility that is smooth and pleasant to the user. The skin reduces the number of uncomfortable and unsanitary tangible seams in the surface of the massager. In the described embodiment, skin 13 further forms a relatively waterproof, hermetic seal over the entirety of the vibrating massager 12, again enhancing both the functionality of the device and the user experience. Alternative methods of sealing the device include sealing of the various plastic components described below, skinning with other materials, and others that are discussed in further detail below and/or will now be apparent to the reader.

Further incorporated within vibrating massager 12 are two controls, in the form of buttons 20, 22, positioned underneath of but visible and operable through skin 13 and extending into the body of the massager as described below. In the described embodiment, the buttons 20, 22 interact with internal switches (described below) while the upper surfaces of the buttons include lights, for example LEDs, indicating their status as described below. A decorative collar 18, optionally included either on top of or underneath of skin 13, can be used to decorate the vibrating massager. The decoration can take many forms, including brand display and/or embellishments common to jewelry design such as inlay, plating, inset stones, personalized etchings or engravings, or other customizations. Optionally, collar 18 may be used to facilitate the mechanical assembly of the device in the manner described below.

Figure 7:
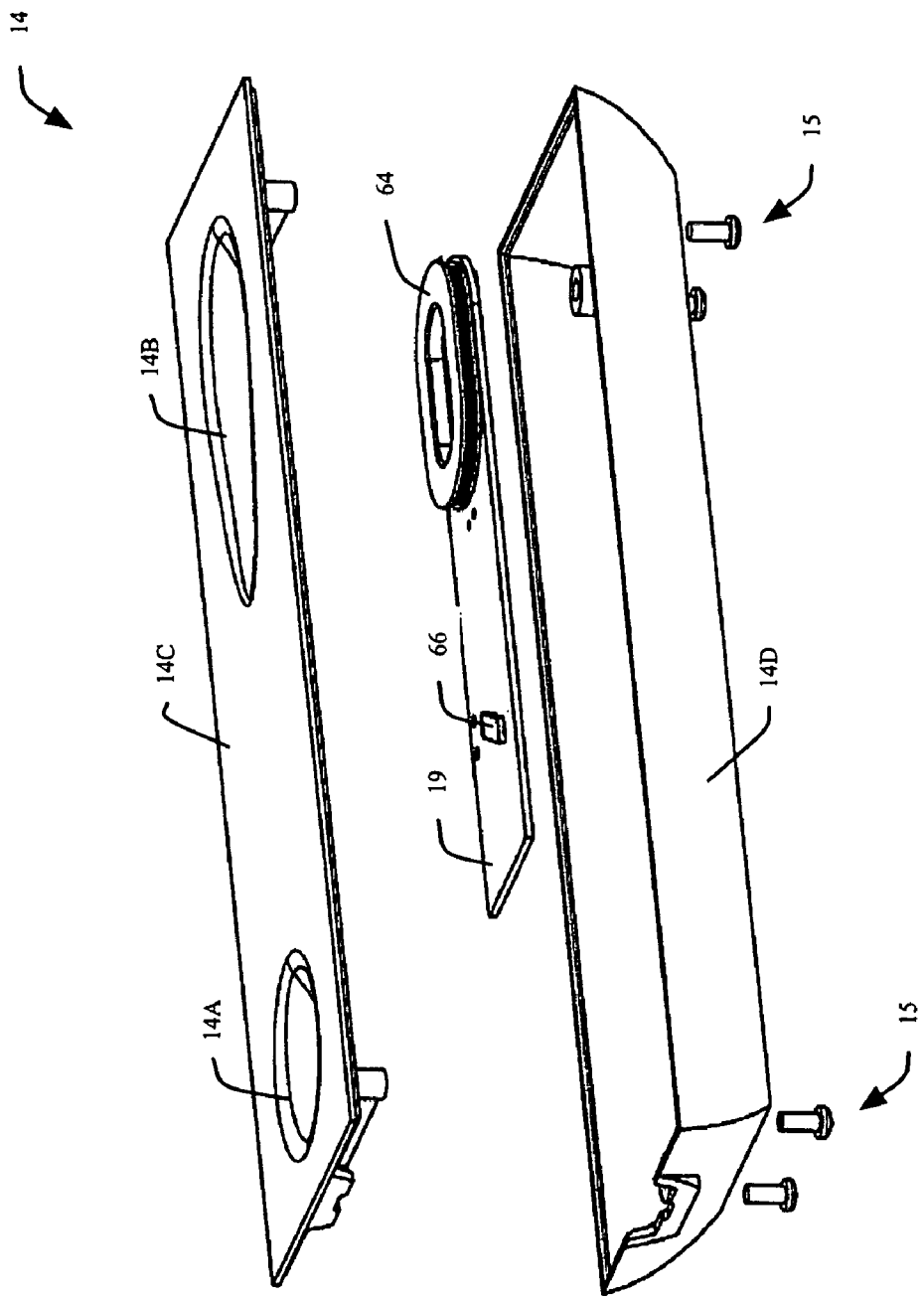
FIG. 7 is an assembly view of the base of FIG. 1.

Continuing with reference to FIG. 1 and now also FIG. 7, charging base 14 is seen to be relatively 'brick-shaped' or rectangular in shape, and to include a lower surface 14D for supporting the charger on a flat surface such as a sink, bureau, or bedside table. The charger further includes an electrical connection 16 for receiving power from an external source such as a 110V or 220V wall plug. An upper surface 14C of the charging base includes a pair of ovoid indentations 14A, 14B for receiving the ends of the vibrating massager 12 in a supportive, stable relationship. In accordance with features and advantages of the present invention, base 14 is shaped to receive vibrating massager 12 in engaging relationship, conveniently and stably supporting the device while it is inductively charged in the manner described herein below.

Internal to the charging base 14 (as visible in FIG. 7) is seen a circuit board 19 supporting a power converter 66 and inductive coil 64, the functions of which are described herein below. Corner feet, for example in the form of self-adhesive rubber disks, can be used to conceal the screws used to secure top 14C to bottom 14D, the screws being indicated generally at 15.

Figure 3:
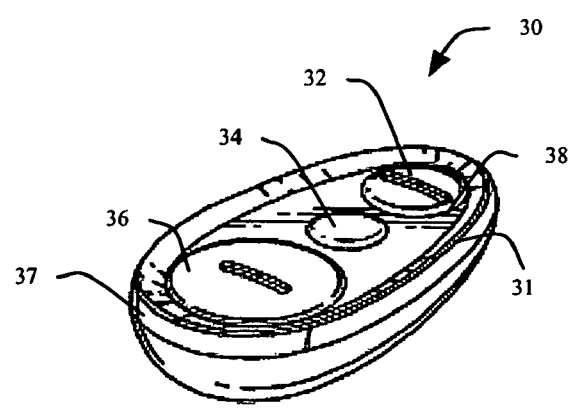
FIG. 3 is a perspective view of a remote control for the vibrating massager of the present invention.

With reference now to FIG. 3, there is shown the external structure for a remote control device 30 for controlling the operation of the vibrating massager 12. In the described embodiment, remote control 30 is seen to comprise generally the shape of a sectioned ovoid 37, a flat surface provided by a membrane switch 38 supporting a variety of controls, in the form of button-controlled switches, indicated generally at 32, 34 and 36. The remote control 30 is constructed of a pair of mating sides each containing internal structure for supporting various internal components. This external structure of the remote control comprises, for example, a material such as acrylonitrile butadiene styrene (ABS) plastic, polycarbonate (PC), thermoplastic elastomer (TPE), polyethylene, liquid crystal polymer (LCP), cellulose acetate propionate (CAP), nylon, a polycarbonate and ABS blend (PC-ABS) or other materials, thermoplastic or otherwise.

Figure 6:
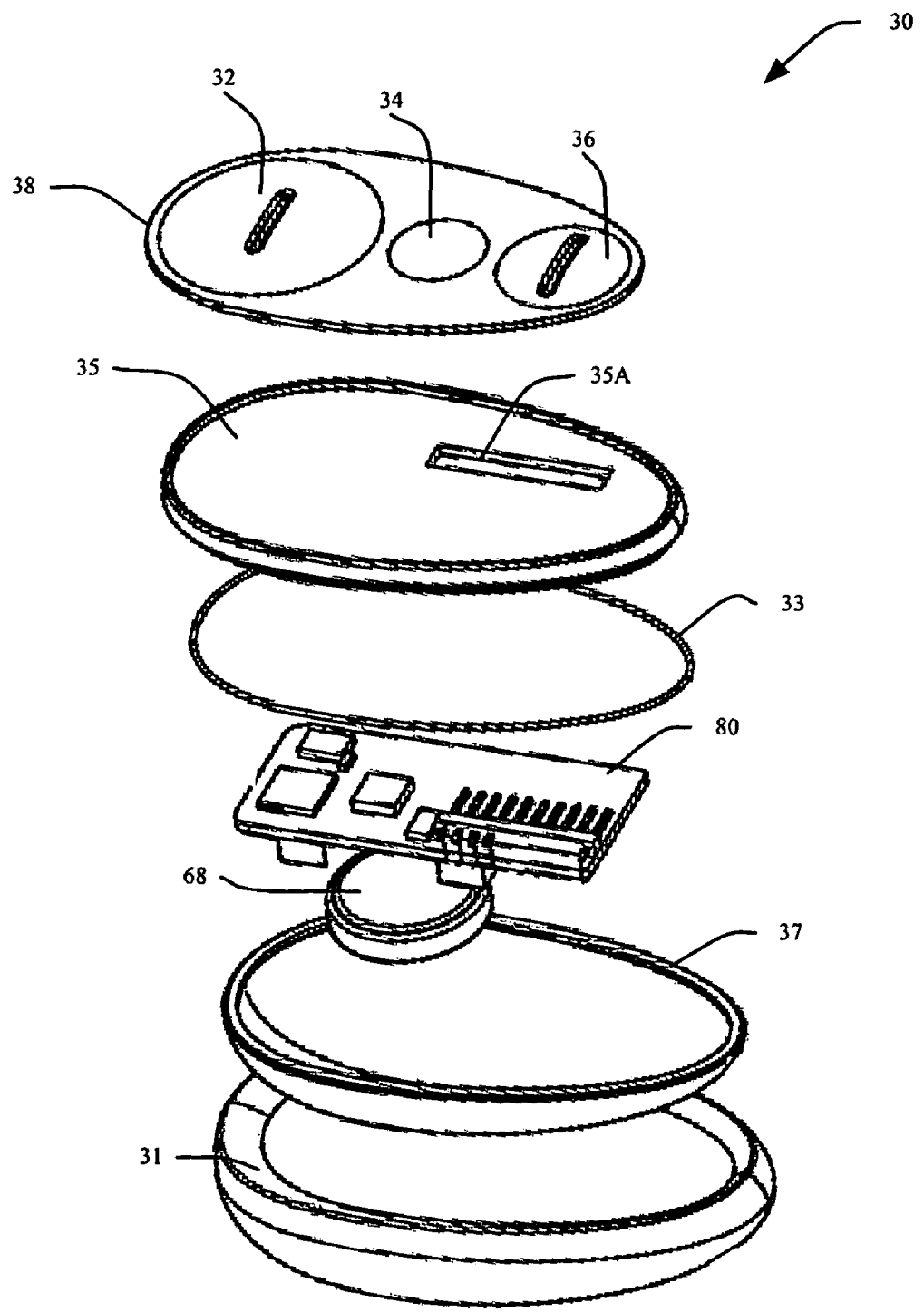
FIG. 6 is an assembly view of the remote control of FIG. 1.

With reference now also to FIG. 6, the internal components of remote control 30 are seen to include a battery 68, rechargeable or otherwise, and an electronic circuit board 80 supporting electrical components including a microcontroller, an antenna, four LEDs, a connector for the wiring to the membrane switch 38, and additional supporting circuitry as described herein below. The electronic components support a variety of functions including: receiving and processing radio frequency control signals, receiving and processing signals from user operated controls such as button switches 32, 34 and 36, and controlling the illumination of the LEDs. The button switches are of a "membrane switch" type, the switches incorporated within the membrane and operable by the button switches. This construction offers the benefits of being impervious to water and other fluids, smooth and continuous in form such that the surface is easy to keep clean, and inexpensive to manufacture. Button switches 32 and 36 each provide access to two momentary switches within the switch membrane. Each of the two buttons can then support a plus/minus functionality to enable the user to intuitively increase or decrease the activity of each of the two motors in vibrator 12. The various functions of these controls are described in greater detail herein below.

From FIG. 6, it will be seen that the ovoid shape of remote control 30 is derived from a plastic ovoid housing bottom 37, with the upper flat surface formed by switch membrane 38 overlying a plastic housing top 35. Housing top 35 includes an aperture 35A facilitating the electronic connection of button switches 32, 34, 36 with the switches on the circuit board 80. An oval seal, or o-ring, 33 provides a seal between housing top 35 and housing bottom 37. The various electronic components are contained within the housing, the housing skin 31 covering the plastic housing components while wrapping over the edge (visible in assembled form in FIG. 3) of switch membrane 38.

The flat surface 38, and the raised planar edge of the housing skin 31 enables the remote control device 30 to rest "face-down" thereby concealing the controls and giving the device a unique, clean and appealing aesthetic appearance. As described above, in the illustrated embodiment, remote control device 30 is sealed with a rubber o-ring 33, and further sealed by a removable, thin, bio-compatible 'skin' 31, formed, for example, from silicone or a thermoplastic elastomer (TPE). This sealing makes the remote control device 30 secure from external fluids and liquids, as well as providing a tactility that is smooth and pleasant to the user. The skin reduces the number of tangible seams in the remote control, improves the user's grip on the device, and protects the device from shock when dropped. The remote control outer skin 31 can also permit the remote control device 30 to attach via suction to a smooth surface, such as glass, tile, mirror, or the side of a bathtub, providing a useful and unique means of storing the device when it is not in use. In the described embodiment, the skin forms a secondary waterproof seal over the convex portion of the remote control device, again enhancing both the functionality of the device and the user experience. Alternative methods of sealing the device include sealing of the various plastic components such as by ultrasonic welding, skinning with other materials, and others as will now be apparent to the reader.

Figure 4:
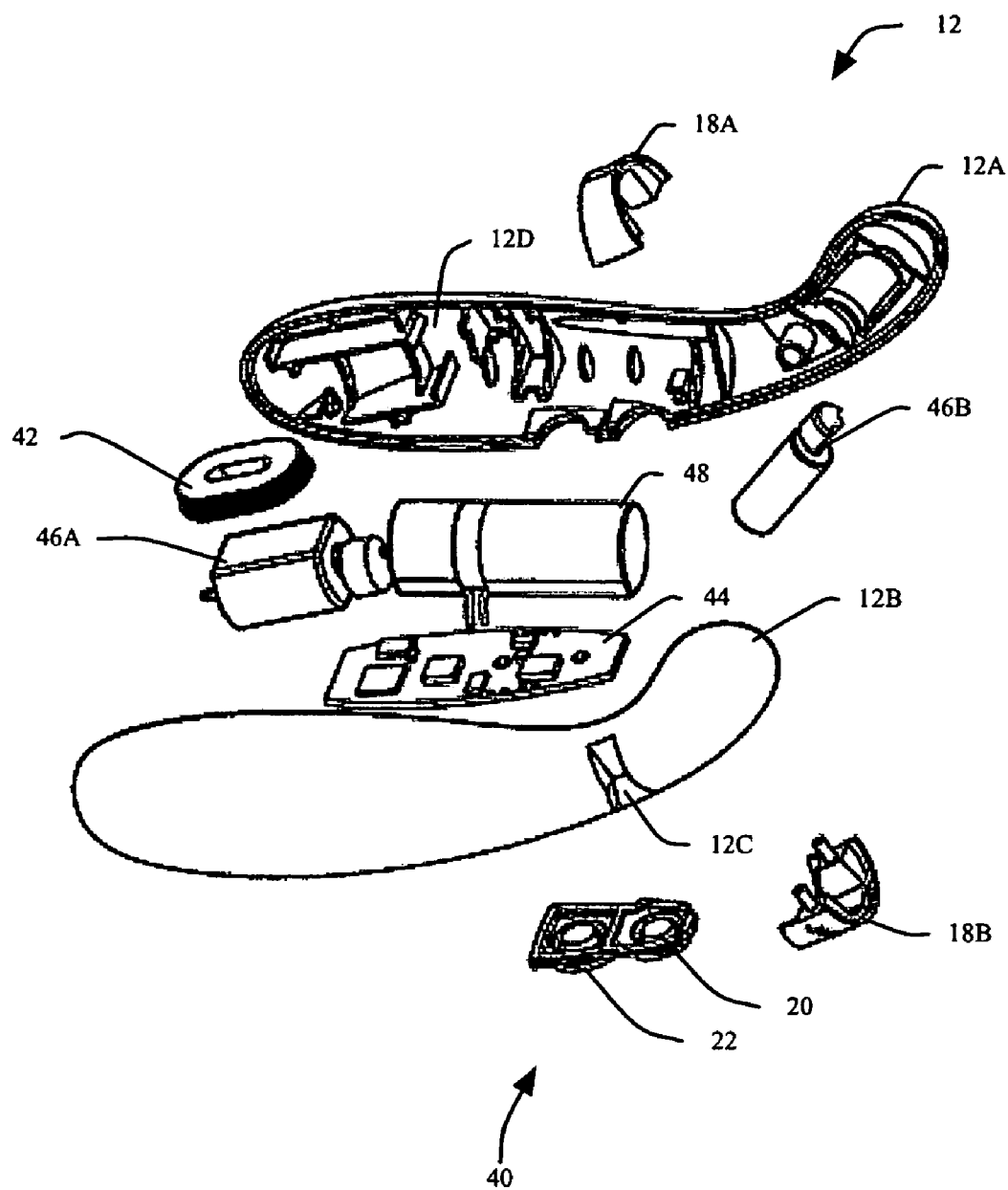
FIG. 4 is an assembly view of the vibrating massager of FIG. 1.
Figure 5:
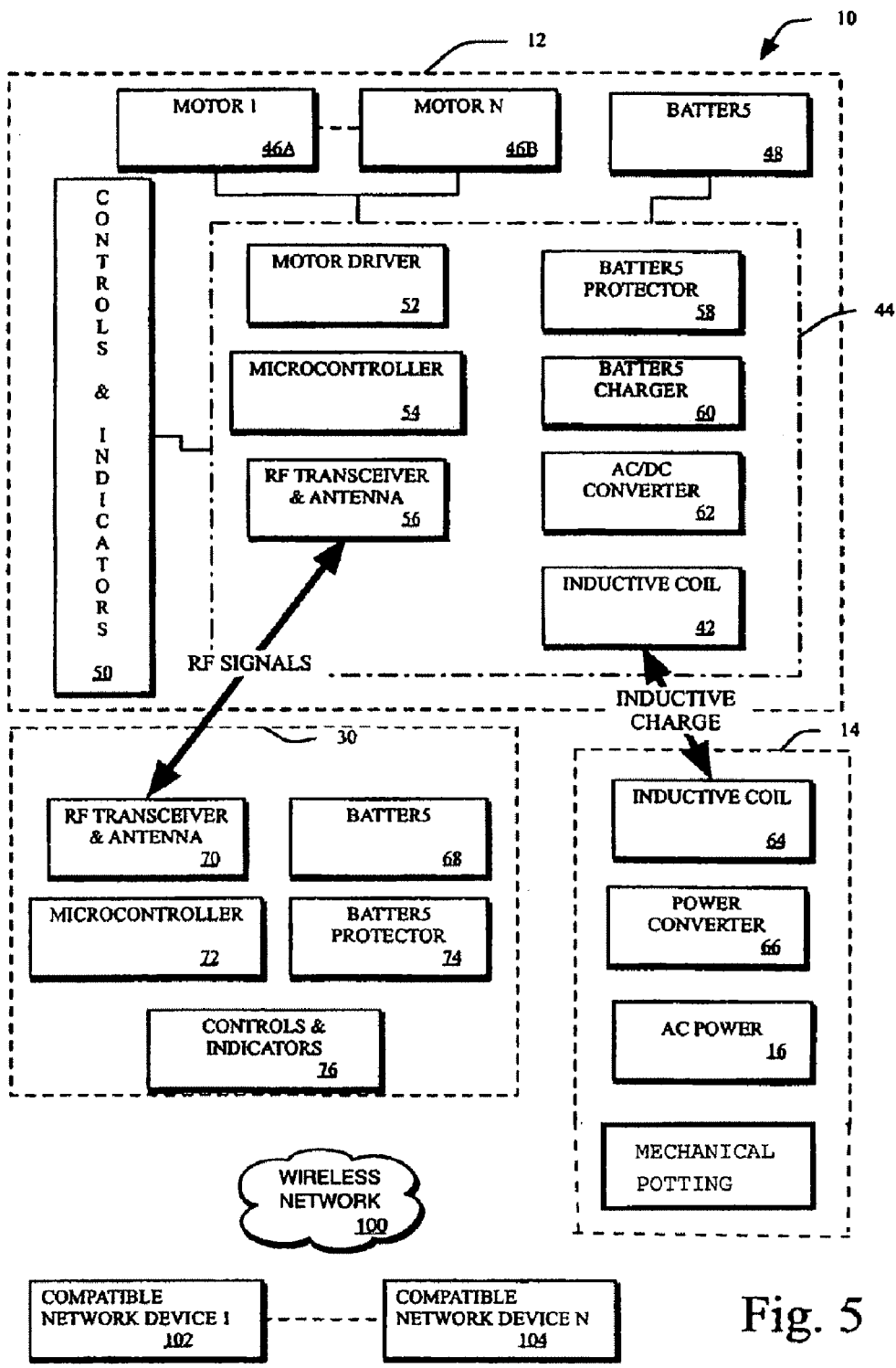
FIG. 5 is a block diagram view showing the functional components of the vibrating massager, inductive charger and remote control.

The electro-mechanical structure and function of system 10 will now be described with respect to FIGS. 4 and 5, FIG. 4 showing an assembly view of vibrating massager 12, FIG. 5 showing a block diagram functional view of the massager, base 14 and remote control 30.

With reference first to FIG. 4, there is shown a mechanical assembly view of vibrating massager 12, the massager including a pair of mating sides indicated at 12A, 12B each containing internal structure 12D for supporting various internal components. This external structure of the massager comprises, for example, a plastic or thermoplastic as described above.

The internal components of vibrating massager 12 are seen to include an an energetic coupler such as an inductive charging coil 42, a power source such as battery 48, and a pair of vibrating motors indicated at 46A, 46B. An electronic circuit board 44 supports electrical components, further described herein below, for a variety of functions including: supporting the charging of battery 48, receiving and processing radio frequency control signals, receiving and processing signals from user operated controls such as buttons 20 and 22, and controlling the operation of motors 46A, 46B.

As is apparent from FIG. 4, when assembled, motors 46A, 46B are positioned at generally opposite lateral ends of massager 12, the circuit board 44, battery 48 and inductive coil 42 generally supported towards the center of the device. The switches 20, 22 are towards the center of the device. This assembly provides vibrating massager 12 with a pleasant balance to the user and convenient access to the switches when the massager is held in a user's hand, regardless of the orientation of the device. It is noted that, in accordance with a feature of the invention, the motors 46A, 46B are arranged at opposite ends of vibrating massager 12, enabling the massager to be used at both ends. The motors are of different sizes and offer different operating characteristics. Motor 46A is a large motor with a relatively larger vibration weight mounted on its axle. This motor is thus configured to produce very strong, lower frequency vibrations. Motor 46B is a smaller motor with a relatively smaller vibration weight mounted on its axle. This motor is thus configured to produce higher frequency vibrations, and to be able to respond more nimbly to intricate control signals. The motors are positioned non-linearly on different longitudinal axes within vibrating massager 12. The massager thus has the advantage of providing significantly different tactile sensations to the user depending on the motor(s) operated and surface(s) applied to the body. Further, when both motors operate simultaneously, the two frequencies of vibrations generated can interfere or resonate, thereby generating additional sensations for the user.

It will be understood that, in different embodiments, different numbers and types of motors may be operated and different numbers of controls may be provided directly on the housing of the vibrating massager 12.

In the illustrated embodiment, decorative collar 18 is seen to include a pair of matching halves, indicated at 18A, 18B, the collar halves engaged in a pressure relationship with one another and keyed into slots 12C (only one of which is visible) for supporting the construction of the massager 12 by assisting to hold mating halves 12A, 12B together.

A button assembly 40 is seen to include individual button switches 20, and 22, in the described embodiment the switches comprising momentary switch, pressure sensitive electronic switches with light emitting diode (LED) indicators indicative of their state. The buttons protrude through the surface of massager 12, remaining underneath skin 13 to support the operation of the massager in the manner described herein below.

While not illustrated in FIG. 4, as noted above, vibrating massager 12 includes a bio-compatible external skin 13 (see FIG. 1), comprised for example of silicone, thermoplastic elastomer (TPE), thermoplastic urethane (TPU) or another material with desirable properties such as tactile quality, bio-compatibility, durability, and ability to bond to the material of parts 12A and 12B. This skin may be of varying thickness, providing different levels of firmness or softness around the body of the device, thereby enhancing as well as increasing the number of tactile properties available from the vibrating massager.

With reference now to FIG. 5, considering first the functional operation of vibrating massager 12, the circuit board 44 is seen to include a variety of electronic components, controlled by a microcontroller 54. Microcontroller 54 comprises, for example, a low power, 8 bit, 8 MHz microprocessor, 64 Kb of flash memory, 4 Kb of static ram, 2 Kb of EEPROM, and two pulse width modulation (PWM) channels, many commercial types of which are well known in the art, for example from suppliers such as Intel, IBM, AMD, Texas Instruments, EM Microelectronics, Hitachi and Xemics.

Inductive coil 42 is connected to a charging control and monitoring circuit on circuit board 44 and positioned so as to couple electro-magnetically with a corresponding coil 64 in charger 14, thereby inductively generating a current to charge battery 48. An A/C-to-D/C converter 62 operates to convert the induced current to a D.C. voltage, the voltage supplied to a battery charger 60 for charging battery 48. A battery protector 58 is connected to battery charger 60 in a conventional manner to minimize charge time, maximize battery life, and avoid overcharging of the battery. A motor driver 52 is provided for generating the control signals to drive motors 46A, 46B responsive to the control signals applied and as determined by microcontroller 54, the details of which are described below.

Inductive coil 42 is a wound coil with a ferrite core, selected to provide efficient coupling across the precise distance between the primary and secondary coils in the charger and vibrator, respectively. In a manner well known in the art, coils 42 and 64 may be procured off-the-shelf and/or manufactured to specifications dependant on their desired relative positions and performance. Battery 48 is a conventional high capacity rechargeable battery, such as a lithium ion type battery. Converter 62 is a conventional AC/DC converter that rectifies the incoming, inductively coupled 100 KHz AC signal to generate the 6V DC power required to drive the charger 60. Battery charger 60 is a conventional component designed to handle the complex charging requirements of a high capacity battery. Battery protector 58, another conventional component, protects the battery 48 from over-voltage, under voltage, over-current/short circuit, and over-temperature conditions. Battery charger 60 and protector 58 can be in the form of an integrated circuit(s), for example of the type available from Linear Technology.

A radio frequency transceiver and antenna 56 is included for receiving radio frequency control signals, in the ZigBee™ wireless communications protocol, from remote control device 30 or other control devices as described below. The received signals are operative with microcontroller 54, motor driver 52 and the user controls and indicators 50 for controlling the operation of the motors 46A, 46B. In this described embodiment of the invention, microcontroller 54 and the motor driver 52 operate to provide pulse width modulation control of the motors 46A, 46B, this PWM control providing significant advantages as described here in below.

It will be understood that the controls and indicators 50 include the controls and indicators physically mounted on vibrating massager 12 for direct operation by a user of the massager. In the described embodiment, these controls include buttons 20 and 22 that interact with the above-described switches on circuit board 44. It will be understood that in different embodiments, numerous other user controls and indicators may be included on the physical structure of vibrating massager 12.

Continuing with reference to FIG. 5, considering now the functional aspects of charger 14, the charger is seen to include an alternating current (A/C) power source 16, for example a corded connection to a conventional 110V/220V external power source. Charger 14 further includes the power converter 66 for converting the frequency of the A/C power, and an inductive coil 64 for inductively coupling the converted power to inductive coil 42 whereby to charge battery 48. Power converter 66 is composed of a passive component circuit for converting 50 Hz or 60 Hz AC to DC and an active switching component for converting this DC voltage to 100 KHz AC. As described above with respect to coil 42, inductive coil 64 is comprised of a wound coil with a ferrite core, selected to provide efficient coupling across the precise distance between the primary and secondary coils in the charger and vibrator, respectively.

In the described embodiment, the various electronic components within the base 14 are potted within an epoxy or an equivalent sealant whereby to provide both a waterproof seal and a weight sufficient to securely support vibrating massager 12 during charging and/or non-use. The outer housing of base 14 is preferably plastic, but may be manufactured from or further include other functional or aesthetic materials. The charger 14 can incorporate other desirable features or take a multitude of alternate forms, for example, the charger could incorporate cable management system for the A/C power cable. Alternatively, the charger could be incorporated into a box or similar enclosure to aide privacy, security, and transportation, or into a soft structure such as a pillow so that it could be stored on a bed and blended with other pillows. The vibrator could also engage with the charger in different orientations, for instance, it could stand vertically in the charger. Further, the charger could be optimized to be used universally for a variety of compatible vibrators, remotes, or other powered products.

In another embodiment, the charger could be used in conjunction with an external packaging design that incorporated induction coils within the packaging itself, for example, a bottle or other container having an induction coil therein. The power generated by the inductively coupled coils, that is between the coil in charger 14 and the coil in the external package, could be used for the illumination of the package (if the packaging incorporated an LED or other light source), or for the warming of a product contained within the packaging. Thus, for example, in addition to functioning to charge massager 12, base 14 could simultaneously function to warm a receptacle of a liquid medicinal or oil.

With reference now to remote control 30, the functional components as shown in FIG. 5 are seen to include a microcontroller 72 for controlling the various components of the remote control. The battery 68 and an optional battery protector 74 are provided for powering the remote control. An RF transceiver and antenna 70, mentioned herein above, are provided for generating and communicating RF control signals in the ZigBee™ wireless communications protocol to the corresponding transceiver 56 in vibrating massager 12. In one embodiment, the ZigBee™ functionality is provided by firmware residing in the memory of the microcontrollers 54 and 72, and is processed by the microprocessors. In other embodiments, the ZigBee™ functionality is incorporated into the RF transceivers 56, 70 and/or in a ZigBee™-functional integrated circuit coupled to the microcontrollers and/or the transceivers. Controls and indicators 76, including the illustrated button switches 32, 34 and 36, are included for enabling a user to remotely control the operation of vibrating massager 12 in accordance with the description herein below.

The various components of remote control 30, including a battery 68, battery protector 74, microcontroller 72, the various RF transceiver components 70, and the controls and indicators 76, comprise conventional components well known to the reader. Microcontroller 72 comprises, for example, an 8 bit, low power, 8 MHz processor with 64 Kb of flash memory, 4 Kb of static ram, 2 Kb of EEPROM, of the type generally described above with respect to microcontroller 54, and further including an optional, conventional integrated and/or interconnected analog-to-digital converter circuit. Battery 68 is a high capacity, high voltage battery such as a lithium or lithium ion type battery. The optional battery protector 74, for example of the type described with respect to protector 58 above, protects the battery 68 from over-voltage, under voltage, over-current/short circuit, and over-temperature conditions. A conventional radio frequency transceiver and antenna 70 is included for receiving radio frequency control signals in the ZigBee™ wireless communications protocol from vibrating massager 12 or other devices.

Referring again to FIG. 5, for purposes of illustrating the vibrator system of the present invention in a network of compatible wireless devices, two such devices 102, 104 are shown connected with system 10 in a ZigBee™ wireless network 100 configuration. The reader will understand that devices 102, 104 can comprise one or more of the below-described devices, sensors and/or systems, each ZigBee™ wireless compatible and communicating in the network with each other and/or system 10 using the wireless protocols as described below.

Construction of the Invention

In construction, as described above, the two motors 46A, 46B are positioned at opposite ends of the vibrating massager 12, whereby to apply vibratory motion to either end selectively and/or the entirety of the massager. In the described embodiment, motor 46B is relatively smaller than 46A, each motor fitted with an offset weight attached axially whereby to impart vibrations to the massager. As described above, in the illustrated embodiment, the motors are positioned offset axially from each other. It will be appreciated that the relative size, position and function of the motors and rotating weights are selected to provide the desired vibratory effects to massager 12. Different configurations may be selected to provide different vibratory effects for medical treatments as well as for adult sexual stimulation.

In the described embodiment, the two halves of the vibrating massager 12, indicated at 12A, 12B (see FIG. 4) are ultrasonically welded together so as to seal the device against moisture and other outside pollutants. The skin layer 13 is then over—molded onto the outside of the sealed housing, providing both a hygienic effect and reinforcing the waterproof seal of the ultrasonic weld.

Operation of the Invention—Inductive Charging

In operation, as noted above, the charger 14 includes an upper surface 14C that supports the vibrating massager 12 and guides it into a specific orientation which optimizes the inductive coupling between the inductive coils 42 and 64 in the two units.

When the vibrating massager 12 is placed on the charging base 14 in the proper position, LEDs located beneath buttons 20 and 22 on the massager illuminate for one second to indicate that the inductive coil 62 in the charger and the inductive coil 42 in the massager have coupled successfully, and that charging is underway. This one second illumination is followed by a series of short flashes, 250 ms in duration, which indicate current charge level as follows:

| Number of Flashes | Charge Level |
| --- | --- |
| 1 | Very Low |
| 2 | Low |
| 3 | Medium |
| 4 | High |
| 5 | Full |

Alternatively such feedback may be provided by an audio device such as a speaker or beeper, or by tactile feedback such as vibration, or other forms of user-discernable feedback as will be apparent to the reader.

The charging of battery 48 in vibrating massager 12 is controlled by circuitry in power converter 66 that optimizes charging time and battery life. The charging functionality in the described embodiment is optimized for the use of a single lithium-ion type battery 48. Other types of rechargeable batteries, such as nickel metal hydride (NiMH) or multiple batteries and/or battery types could be used in the massager, with the charging functionality then optimized for those battery configurations.

The vibrating massager 12 reacts intelligently to its charging status. The massager can indicate its battery level (e.g. fully discharged, low, medium, high, or fully charged) by flashing its LEDs in the pattern indicated above. The massager will cease motor operation before the batteries are fully drained so that it can maintain other basic functions, such as radio frequency communication with remote control 30 or indication of status via the illumination of the LEDs. In the described embodiment, the massager cannot be turned on when in the charger and, if the massager is vibrating when it is placed in or near the charger, it will automatically shut off.

In addition to the advantages described above, including no need to change batteries or deal with electrical cords, inductive charging provides the significant advantage of generating exothermic heat, providing vibrating massager 12 with a palpably warm, pleasant sensation to the user.

Operation of the Invention—User-Controlled Operation

As will be apparent to the reader, at least two methods of directly operating vibrating massager 12, are readily available to the user, the first comprising the operation of the buttons 20, 22 directly on the housing of the massager. This operation is described with respect to Table 1 below, wherein:

TABLE 1

| | |
| --- | --- |
| Switch 20 | Pressing switch 20 when motor 46B is off will turn motor 46B on at low speed<br>Pressing switch 20 again will speed up motor 46B to medium speed<br>Pressing switch 20 a third time will speed up motor 46B to high speed<br>Pressing switch 20 a fourth time will return motor 46B to being off |
| Switch 22 | Pressing switch 22 when motor 46A is off will turn motor 46A on at low speed<br>Pressing switch 22 again will speed up motor 46A to medium speed<br>Pressing switch 22 a third time will speed up motor 46A to high speed<br>Pressing switch 22 a fourth time will return motor 46A to being off |
| Control Lock | Pressing and holding either switch 20 or switch 22 for 2 seconds will turn off both motors and will put the massager in a locked state.<br>When the massager is locked, pressing switch 20 or switch 22 momentarily will have no effect.<br>Pressing and holding either switch 20 or switch 22 for 2 seconds when it is in a locked state will return the massager to an unlocked state. When switch 20 or switch 22 is then released, the LEDs beneath both switches will flash to indicate current battery level, per the description above. |
| Pause and Resume | If one or more motors are on, pressing both switch 20 and switch 22 will turn off all motors and will put the massager in a paused state.<br>When the massager is paused, momentarily pressing switch 20 or switch 22, or both switches simultaneously will cause the massager to return to the same level of activity prior to being paused. |
| Network Formation | Pressing and holding both switch 20 and switch 22 for 5 seconds will turn off any motor that is on and will cause the massager to broadcast a request to form a network.<br>The massager will continue to broadcast the request for |

TABLE 1-continued

| | |
|---|---|
| | 5 seconds after one or more switches are released. Both LEDs will flash rapidly as long as the request is being broadcast.
If, while broadcasting a request to form a network, the massager receives an acknowledgement from another device, it will add the device to the network, and will then continue to broadcast its request to form a network for an additional 5 seconds.
If, after 5 seconds of broadcasting a request to form a network, the massager does not receive an acknowledgement from another device, it will cease to broadcast the request and will complete the network formation with the devices, if any, that provided an acknowledgement during the network formation cycle described above. |
| Special Functions | Specific sequences of button presses can be programmed to access special vibration patterns and modes that are otherwise inaccessible to the user. This "hidden" functionality is similar to "cheat codes" embedded in video games. These specific sequences can be released to users for example as part of a marketing campaign for the massager. |

It will be understood by the reader that the operation of controls 20, 22 are managed by microcontroller 54 and that many different variations of the control functions described may thus be programmed into the vibrating massager of the present invention.

In the described embodiment of the invention, motors 46A, 46B are operated by motor driver 52 using pulse width modulation (PWM). As is known in the art, PWM uses the duty cycle of the control signal to control the motor operation. At full power, the PWM circuit provides power to the motors 100% of the time. At partial power, the PWM circuit provides power to the motors the same partial percentage of time. In accordance with this aspect of the present invention, PWM control of the motors provides enhanced responsiveness in comparison to conventional amplitude modulation control. This provides significant advantages, including the ability to operate the motors at lower speeds, providing low frequency vibrations, as well as the ability to provide fine control of the motor operation in accordance with the relatively complex control signals described below.

Operation of the Invention—Remote Control Operation

It will be apparent to the reader that at least the same functions described above with respect to the user controls 20, 22 can be applied remotely using controller 30. Due to the inclusion of additional buttons, that is five button switch functions on remote control 30 versus two button functions directly on the massager 12, further functions of the vibrating massager are available using the remote control 30 as described.

As described above, there are three button switches 32, 34 and 36 on the remote controller that are used to provide control of the massager in wireless operation, either individually or as part of a network. Two of the three button switches, 32 and 36, interact with two-each underlying, momentary control switches (incorporated within the membrane surface 38, see FIG. 6) to provide bi-directional control. Such bi-directional control provides +/−, or 'increase/decrease,' functionality to intuitively increase or decrease the activity of two motors or other controllable features. The center button switch 34 is not bi-directional, but operates a single underlying momentary contact switch, also incorporated within the membrane surface 38. When depressed individually, each of the bi-directional button switches controls a separate motor.

Bi-directional button switch 32 controls motor 46B, and bi-directional button switch 36 controls motor 46A.

With respect to bi-directional button switch 36, eight discrete motor speeds for motor 46B can be accessed by pressing and releasing the button switch up (36U) or down (36D). More particularly:

Pressing and releasing button switch 36U will increase the speed of motor 46B to the next higher speed until it reaches its maximum speed.

Pressing button switch 36U when motor 46B is at maximum speed will have no effect.

Pressing and releasing button switch 36D will decrease the speed of motor 46B to the next lower speed until it turns off.

Pressing button switch 36D when motor 46B is off will have no effect.

Pressing and holding button switch 36U will cause motor 46B to gradually and linearly increase in speed until it reaches its maximum speed. When button switch 36U is released, motor 46B will maintain whatever speed it has reached.

Pressing and holding button switch 36D will cause motor 46B to gradually and linearly decrease in speed until it stops. When button switch 36D is released, motor 46B will maintain whatever speed it has reached.

The operation of bi-directional button switch 32 is identical to that of button switch 36, but with respect to the control of motor 46A.

In contrast to the operation of button switches 32 and 36, button switch 34 functions to operate preset vibration patterns and/or combinations of patterns. More particularly:

Pressing and releasing button switch 34 causes the massager to cycle through different vibration combinations according to the following Table 2. With each press of the button, the vibrator steps to the next combination. For example, if the massager is following combination 2 and button 34 is pressed, it will switch to combination 3. If button switch 34 is pressed when the massager is following combination 5, it will return to combination 0.

If a button is pressed on the massager, regardless of what combination the massager is in, the massager switches to combination 0.

Pressing and holding button switch 34 for 3 seconds will cause the controller to reply to a request to form a network from a massager or other device by sending the ZigBee™ PAN ID (Personal Area Network Identification) of the controller to the requesting device. If a network is found, all LEDs will flash in a repeating sequence from LED 1 to LED 2 to LED 3 to LED 4 while network formation is occurring. All four LEDs then flash 3 times together to indicate successful completion of network formation. If no network is available to join, two of the LEDs will flash, then the other two LEDs will flash in an alternating pattern that is repeated 5 times to indicate a network formation error.

TABLE 2

| Combination | Motor 1 Activity | Motor 2 Activity |
|---|---|---|
| 0 | Constant vibration | Constant vibration |
| 1 | 0.25 Hz slow sinusoidal pattern | 0.25 Hz slow sinusoidal pattern, +180 degree phase shift |
| 2 | 1 Hz fast sinusoidal pattern | 0.25 Hz slow sinusoidal pattern, +180 degree phase shift |
| 3 | 1 Hz fast sinusoidal pattern | 1 Hz fast sinusoidal pattern, +180 degree phase shift |
| 4 | 2 Hz fast square wave pattern | 2 Hz Fast square wave pattern, 0 degree phase shift |
| 5 | 2 Hz fast square wave pattern | Constant vibration |

The button switches 32, 36 in combination provide other functions, particularly:

If no motor is on, simultaneously pressing button switch 32U or 32D and button 36U or 36D will have no effect.

If one or more motors are on, simultaneously pressing button switch 32U or 32D and button switch 36U or 26D will turn off all motors and will put the massager in a paused state.

When the massager is paused, momentarily pressing button switch 32U, 32D, 36U, or 36D, or pressing both button switch 32U or 32D and button switch 36U or 36D simultaneously will cause the massager to return to the same level of activity prior to being paused.

As also discussed below, specific sequences of button switch presses can be programmed to access special vibration patterns and modes known to the manufacturer and, unless disclosed, otherwise inaccessible to the user. This functionality is similar to "cheat codes" embedded in video games. These specific sequences can be released to the public periodically as part of a marketing campaign for the controller.

Operation of the Invention—Wireless Network & Control Signal Operation

The ZigBee™ functionality used in the present invention provides significant advantages over its closest competitor, BlueTooth™, another well-known wireless communications protocol. As is known in the art, BlueTooth™ compatible devices are relatively high power-consumption devices using frequency-hopping technology and generally limited to 7 nodes, or devices, in a picocell. In comparison, ZigBee™ compatible devices utilize the ZigBee™ protocol stack, consume relatively less power, use direct-sequence spread spectrum (DSSS) technology in the IEEE 802.15.4 standard and enable more devices, in fact a relatively unlimited number of devices, within each network. ZigBee™ compatible devices further provide a broadcast mode of local communication to send out data to any compatible device, a multicast mode of local communication to send out data to one or more specified devices and the ability to self-organize into a mesh network, further discussion of which is had below.

Considering the advantages provided by the ZigBee™ functionality in comparison to BlueTooth™, the present invention provides: i) significantly lower power consumption, ii) concomitant lower hardware costs, and iii) the ability to more easily and straightforwardly connect large numbers of compatible devices in complex network configurations. More particularly, ZigBee™ compatible devices such as those shown here can operate in both a "many-to-1" configuration, e.g. many controllers controlling a single device, or a "1-to-many" configuration, e.g. one controller controlling multiple devices, the latter being a capability believed to not be offered by BlueTooth™. While ZigBee™ communications protocols can currently be applied in a variety of frequencies, including 900 MHz and 2.4 GHz signals, in the described embodiment of the invention, the broader bandwidth 2.4 GHz frequencies are used, providing advantages including more sensitive controls and international regulatory agency compatibility. This bandwidth enables transmission and receipt of complex control signals, with sufficient resolution (250 kilobaud) to cause a device to respond accurately and contemporaneously to signals as complex as a musical audio or other complex control signals.

In different embodiments, the present invention takes advantage of the ZigBee™ broadcast mode or multicast mode of operation and/or the ability to straight-forwardly assemble compatible devices into a self-organizing mesh network(s). Using these capabilities, massager 12 and/or remote control 30 can both transmit their availability for networking with other compatible devices within communications range, and subsequently self-organize into networks with available devices. These features give the present invention the capability to operate in different modes of operation, for example: as described above, one controller can control one or many massagers, multiple controllers can control a single massager and, multiple groupings of controllers and massagers can operate in the same space without interfering with one another. It further provides the invention with the ability to network with many other types of devices and interact with many different control signals and controller arrangements as described herein below.

As noted, all devices that share a compatible implementation of the ZigBee™ protocol, including other types of devices, are able to inter-operate with one-another. If a user, for example, tires of a particular vibrating massager's operation, they can simply purchase a new remote control with different operating characteristics, and the massager will take on any new characteristics and capabilities programmed into the new controller. Conversely, a user can add a new massager with a new physical form and/or mechanical capabilities and it will be operable with any ZigBee™-compatible controller that the consumer already owns.

Other ZigBee™ functional devices can interact with the vibrating massager. For example, vibrating massager 12 can collect data and interpret and respond to this data. The massager can transmit internally generated and/or externally received data to other devices and systems within communications range. As examples, one or more biofeedback sensors can be used to detect one or more bodily functions such as a level of arousal as indicated by a heart rate, respiratory rate, body temperature, galvanic skin resistance, blood flow, muscular activity, neural activity, etc., the bodily function data used to control the operation of the massager. Location sensors can detect positional data such as location, orientation, acceleration, etc. Environmental sensors can detect conditions such as sound, pressure, temperature, light, etc. All of these conditions, data and information can be transmitted to and received by remote control 30 or other controllers, or sensor devices in the network and/or directly by massager 12 and be used alone or in combination with programmed instructions in the microcontrollers to control the operation of the massager.

Sophisticated control systems can be implemented to control the operation of the vibrating massager 12. Audio-sensing controllers can generate control signals based on environmental sounds, music, voices, voice commands, etc. Alternative input mechanisms such as pressure sensors can be used to generate control signals based upon pressure. Touch pads, such as those used as a pointing device on laptop computers, can provide a relatively simple interface for generating complex control functions. Other control systems based on other pre-existing forms of human-machine and human-computer interaction can be used.

MIDI systems can be used to provide a sophisticated interface for the generation of complex control signals for vibrators alone or in a network with other devices. Alternatively, MIDI signals used for the performance of musical compositions can be reinterpreted as control signals for vibrators alone or in a network with other devices, such that the devices would react synchronously with the composition.

While the invention has been generally described with respect to the transmission of control signals from remote control 30 to massager 14, the reader will understand that the ZigBee™ protocols provide for bidirectional communications. That is, massager 14 can transmit both control and informational data back to remote control 30, or to any other device within the network.

A ZigBee™-compatible, wireless transceiver can be attached to a computer such as a personal computer, portable computer, networked computer or handheld computer, or to a communications device or other electronic device via a USB, FireWire™, parallel, serial, or other input/output port. This transceiver can then be used to receive and send signals to and from the network. Signals generated by a computer or other device can be based upon, for example:

GUI (graphical user interface) programs which can provide users with sophisticated computer interfaces for generating fine GUI-based interaction with one or more massagers or other devices, User programmed signals useable to interact with one or more massagers or other devices can be created, used and stored; these signals can also be shared, embedded in devices, or sold online or through other outlets, Special media played on a computer or other device can be encoded with a control track that causes one or more massagers or other devices to behave in synchronization with the media being viewed or heard; additionally, the media could itself be controlled or altered in response to signals received from the network, Standard media, without a pre-programmed control track, played on a computer or other device, could be interpreted by software, firmware, or hardware and used to cause one or more massagers or other devices to behave in synchronization with the media being viewed or heard, Interactive games played on the computer, individually or in a networked configuration, can generate or respond to signals sent to or received from massagers or other devices, Online peer-to-peer, remote interaction with others online, including chat rooms, virtual communities, dating services, etc. can generate or respond to signals sent to or received from massagers or other devices, Online performer-to-audience multicasts or one-to-one performances can generate or respond to signals sent to or received from massagers or other devices, Online audience-to-performer participation in broadcast or one-to-one performances can generate or respond to signals sent to or received from massagers or other devices, and Others as will now be apparent to the reader.

In still other embodiments, commercially available media such as video game ROMS, audio and/or video CDs and DVDs, and electronic MP3, MPEG and other electronic media files can be encoded with a special control signal track that is extracted and broadcast by a compatible wireless controller connected to the standard outputs of a playback device. The media control signal track can thus be transmitted to cause massagers to behave in synchronization with the games, video or other material being viewed and/or listened to without requiring a specialized media player. In one exemplary embodiment, an encoded control signal in an MPEG or other digital video file can be outputted, for example through a port such as a headphone connector or other output port, to a wireless ZigBee™-compatible transmitter for controlling the massager in a desired synchronization with the media content.

Pagers, cellular phones and other portable, ZigBee™-compatible communications devices can be used to generate control signals, remotely controlling massagers directly and/or through existing national and international communication networks. Additionally, where these devices are not ZigBee™-compatible, a secondary device can be used which would connect to the portable communications device, wirelessly or otherwise as supported by the devices, and translate its signals to a ZigBee™-compatible format.

Alternate Embodiments of the Invention

While the invention has been described with respect to certain illustrated and alternate embodiments, yet other alternative embodiments will now be apparent to the reader. Without limitation, a wide variety of other relative orientations between the base and the massager can be used so long as the desired inductive coupling for charging is obtained. Further, an inductive coupling solution can be used which does not require a specific orientation of the massager relative to the charging base. Different types of energetic coupling, such as capacitive coupling, may be used to charge the massager power source.

The massager 12 can incorporate one or a plurality of different motive sources, for example using solenoids, piezoelectric devices, shape-memory alloys, and other sources of motion, vibratory or otherwise. The motions imparted by these motive sources can include vibratory motions, rubbing motions, tapping motions, undulating motions, swelling motions, contracting motions, bending motions and many others as will now be apparent to the reader.

The batteries 48 and 68 may take one or more of many well-known forms, configurations and/or shapes. Multiple batteries may be used within one or each of the remote control 30 and massager 12. The benefits of the wireless control functionality may be recognized using a non-rechargeable battery. Similarly, the benefits of the rechargeable battery systems may be recognized in the absence of wireless remote control operation.

Different methods can be used for the assembly or construction of the vibrator and different types of materials can be employed in the construction of the vibrator. The outer skin may be replaced with a localized area of soft material such as a silicone, thermoplastic elastomer (TPE), thermoplastic urethane (TPU) or another material with desirable properties such as tactile quality, bio-compatibility, durability, and ability to bond to the material of parts 12A and 12B, or may be omitted altogether.

The massager 12 can take many different aesthetic and/or functional shapes or forms, for example, forms which are larger or smaller in scale, forms which incorporate different contours, or forms which are in configurations which are wearable on the body, mountable on surfaces, etc. The massager 12 can incorporate sensors such as heart rate, galvanic skin response (GSR), or other types now apparent to the reader to supply information to a network of devices. The massager 12 can incorporate LEDs, electroluminescent panels, or other forms of additional illumination for practical or aesthetic purposes. The massager 12 can incorporate rare earth, ferrous, electro- or other types of magnets, such as those types of magnets that are believed to stimulate circulation and have a positive therapeutic effect on the body. In addition to the exothermic heat function described above, massager 12 can incorporate a heating functionality by employing one or more infrared emitters or other electrical or chemical sources of warmth.

In other embodiments, the soft over-mold skin 13 is formed to be changeable, for example through user removal and replacement over the underlying plastic form, so as to inexpensively provide different aesthetic and functional models of the massager for the user. The massager may or may not incorporate cosmetic details such as the metal band 18.

Numerous alternative configurations of remote control 30 are possible. For example:

The remote control can incorporate one or a plurality of different sources of power.

The remote control can incorporate one or a plurality of different means of user interaction, including audio speakers, vibrating motors, or different means of illumination.

Different methods can be used for the assembly or construction the remote control.

Different types of materials can be employed in the construction of the remote control.

The remote control may or may not incorporate the use of an outer layer or localized area of soft material such as a silicone, TPE, or other elastomer.

The soft skin can be changed (while maintaining the same underlying plastic form) to inexpensively provide different aesthetic and functional models of the remote control.

The remote control could be made in a wearable form, for example, in a form similar to that of a bracelet or a wrist watch.

Numerous others as will now be apparent to the reader.

While the invention has been described with respect to vibrating massagers, many features and advantages of the invention are applicable to other personal use devices, particularly those involving direct contact with the human body, including but not limited to: electronic toothbrushes and other oral hygiene devices, electronic muscle stimulators such as the Tone-A-Matic™ system, electronic heating pads and blankets, electronically-controlled reclining and operating chairs, non-massaging erotic stimulators such as vacuum pumps and electrical stimulators, electronic acupuncture devices such as the Kodiak Health systems, massaging pillows cushions and pads and other personal use devices as will now be apparent to the reader. It will further be apparent that the invention is not limited to devices that contain an internal power source such as a battery, many aspects of the invention being applicable to externally powered devices such as those described above.

There has thus been provided a new and improved vibrating massager. The massager uses inductive charging, avoiding the need to deal with batteries and cords while providing a pleasant exothermic warmth. Different embodiments of sealing and skinning make the inventive massager hygienically safe and fluid- and water-resistant. Sophisticated controls provide the massager with the ability to respond to direct-mounted user controls, wireless communication controls such as remote controls and a plethora of other protocol-compatible devices, systems and media. A mating base supports the massager for inductive charging in a stable, aesthetically pleasant and safe relationship. The invention has application in the fields of medical and personal appliances, for example in the fields of health care and adult sexual devices.

While the invention has been shown and described with respect to particular embodiments, it is not thus limited. Numerous modifications, changes and improvements, within the scope of the invention, will now be apparent to the reader.

What is claimed is:

1. A massager apparatus, comprising:
    a massager including
        a first electric motive source,
        a rechargeable battery connected to the first electric motive source, and
        a first coupler connected to the battery;
        a massager housing adapted to receive at least the first electric motive source, the rechargeable battery, and the first coupler,
        a soft surface overlaying at least a charging area of the massager housing so as to provide a substantially smooth operative portion for massaging application to a part of the human body;
    a base including
        a base housing,
            a power connector at least partially contained within the base housing,
            a second coupler contained within the base housing connected to the power connector, and
            the base housing including a receiving surface formed to support the massager housing with the first coupler energetically coupled to the second coupler through the receiving surface, wherein the operative portion is in contact with the receiving surface;
    whereby the battery in the massager can be charged using the base.

2. The massager apparatus of claim 1 wherein the first and second couplers are inductive couplers.

3. The massager apparatus of claim 1 wherein the massager housing includes a plurality of plastic components.

4. The massager apparatus of claim 3 wherein the massager housing includes a seal against moisture.

5. The massager apparatus of claim 4 wherein the seal includes an ultrasonic weld between at least some of the plurality of plastic components.

6. The massager apparatus of claim 4 wherein the seal includes a flexible skin molded over the massager housing.

7. The massager apparatus of claim 4 wherein the base includes a mechanical potting containing at least the second coupler.

8. The massager apparatus of claim 1 wherein the massager includes at least one control operable through the massager housing for controlling the operation of the first electric motive source.

9. The massager apparatus of claim 8 further including a remote control for wirelessly controlling the operation of the massager.

10. The massager apparatus of claim 1 wherein: the massager includes a second electric motive source; and the first and second electric motive sources are configured to provide different motive characteristics to the massager housing.

11. The massager apparatus of claim 10 wherein each of the first and second electric motive sources are positioned on a different longitudinal axis within the massager.

12. The massager apparatus of claim 10 wherein each of the first and second electric motive sources are selected from the group comprising motors, solenoids, piezo-electric devices and shape-memory alloys.

13. The massager apparatus of claim 1 wherein the rechargeable battery, the first coupler and the second coupler are positioned to generate heat palpable on the surface of the massager housing when the massager housing is positioned on the base housing to charge the rechargeable battery.

14. The massager apparatus of claim 1 wherein the electric motive source includes an electric motor and the massager further includes: a motor driver connected to the electric motor; and a microcontroller connected to the motor driver; the microcontroller and motor driver operative to control the electric motor with pulse wave modulation control signals.

15. The massager apparatus of claim 1 wherein the massager further includes: an AC/DC converter connected to the first coupler; a battery charger connected to the AC/DC converter; and a battery protector connected to the battery charger and to the rechargeable battery.

16. The massager of claim 1, the massager further including: at least a first and a second electronic switch each contained within the housing and connected to the first electric motive source; and at least a first and a second button each operable through the massager housing by a user; the first and second buttons operable to control the first and second electronic switches whereby to control the operation of the first electric motive source.

17. The massager of claim 16 wherein the massager housing includes a flexible skin covering the first and second buttons, whereby the first and second buttons can be operated by pressing the flexible skin.

18. The massager of claim 1 and further including at least one indicator at least partially within the massager housing for indicating the operation of the first electric motive source.

19. The massager apparatus of claim 1 wherein the massager comprises a curved surface through which the first coupler of the massager is energetically coupled with the second coupler of the base.

20. The massager apparatus of claim 19 wherein the base comprises at least two separate recesses that are each adapted to support the massager when charging.

21. The massager apparatus of claim 1 wherein the first and second couplers are capacitive couplers.

22. The massager apparatus of claim 1, wherein the massager housing is substantially impervious to water and wherein charging of the battery in the massager occurs when the soft surface is positioned in resting engagement with the receiving surface.

23. The massager apparatus of claim 22, wherein the massager housing has two operative portion configured for application to a part of the human body, and wherein the first soft surface forms a portion of one of the operative portions.

24. The massager apparatus of claim 1, wherein the soft surface is a flexible skin.

25. A massager apparatus, comprising:
a massager including
a massager housing having an operative surface configured for massaging application to a part of the human body, wherein the massager housing further includes a flexible, fluid-resistant skin molded over the massager housing,
at least a first electric motor contained within the massager housing for imparting motion to the massager housing,
at least first and second controls contained within the massager housing and operable through the massager housing to control the operation of the first electric motor,
a rechargeable battery contained within the massager housing connected to provide power to each of the first electric motor, and
a first inductive coupler contained within the massager housing connected to the battery;
a base including
a base housing,
a power connector at least partially contained within the base housing,
a second inductive coupler contained within the base housing connected to the power connector, and
the base housing including a surface formed to support the massager housing with the first inductive coupler energetically coupled to the second inductive coupler, wherein the base housing comprises at least two recesses that are each adapted to support the massager when charging; and
each of the first and second inductive couplers and the rechargeable battery positioned so as to generate a palpable warmth to the operative surface of the massager housing when the battery is being inductively charged; whereby the battery in the massager can be inductively charged using the base while the massager housing is warmed.

26. The massager apparatus of claim 25 wherein the massager housing comprises a curved surface through which the first coupler of the massager is energetically coupled with the second coupler of the base.

27. The massager apparatus of claim 26 wherein the first and second inductive couplers are in a spaced-apart relationship when charging.

* * * * *